No. 747,206. PATENTED DEC. 15, 1903.
E. B. MORGAN.
WEEDING HOE.
APPLICATION FILED JAN. 28, 1903.
NO MODEL.

Witnesses
E. B. Morgan, Inventor:
by C. A. Snow & Co
Attorneys

THE NORRIS PETERS CO., PHOTO-LITHO., WASHINGTON, D. C.

No. 747,206. Patented December 15, 1903.

UNITED STATES PATENT OFFICE.

EDWARD B. MORGAN, OF SAGINAW, MICHIGAN.

WEEDING-HOE.

SPECIFICATION forming part of Letters Patent No. 747,206, dated December 15, 1903.

Application filed January 28, 1903. Serial No. 140,913. (No model.)

*To all whom it may concern:*

Be it known that I, EDWARD B. MORGAN, a citizen of the United States, residing at Saginaw, E. S., in the county of Saginaw and State of Michigan, have invented a new and useful Weeding-Hoe, of which the following is a specification.

This invention relates to reversible self-cleaning hoes adapted for garden use for the purpose of weeding around plants and adapted also for field use for the purpose of chopping out or thinning rows of plants—such as cotton, sugar-beets, and the like—where thinning is required, so as to leave stands of plants at a suitable distance apart to insure a more perfect growth.

My invention has for its object to provide a device of this class which shall possess superior advantages in point of simplicity, durability, and general efficiency; and with these ends in view the invention consists in the improved construction, arrangement, and combination of parts, which will be hereinafter fully described, and particularly pointed out in the claim.

Figure 1:
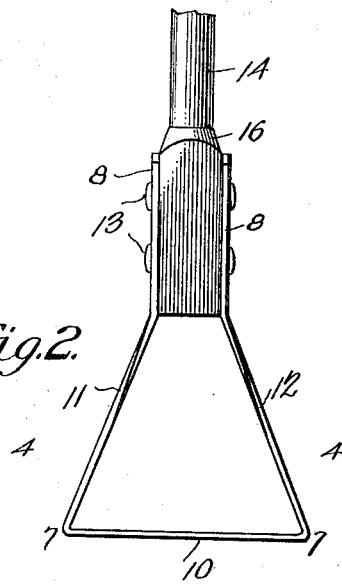
Figure 2:
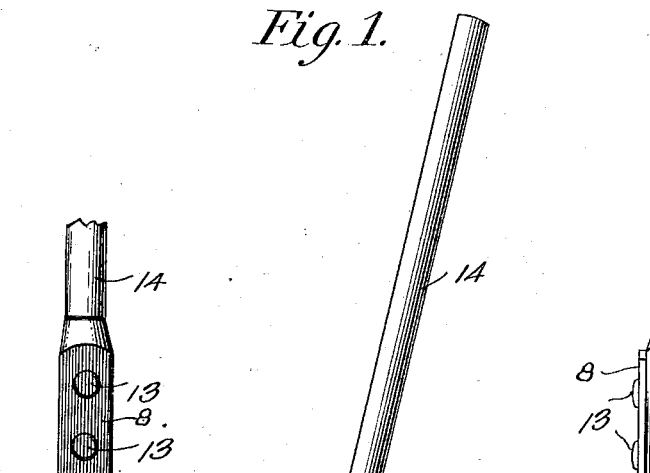
Figure 3:
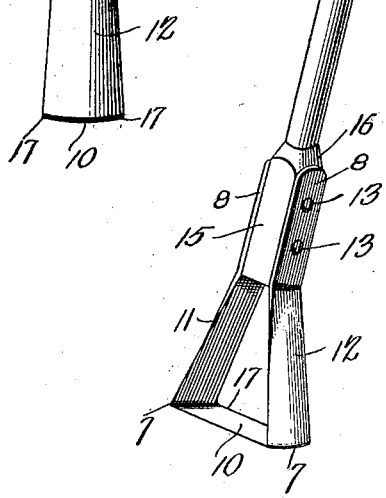
Figure 4:
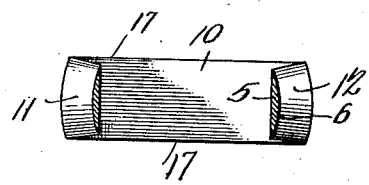

In the accompanying drawings, Figure 1 is a perspective view of my improved implement. Fig. 2 is a front view of the same. Fig. 3 is a side elevation of the head or operative portion of the same. Fig. 4 is a cross-section taken on the line 4 4 in Fig. 2.

Corresponding parts in the several figures are indicated by similar numerals of reference.

My improved implement comprises in its construction a blade, a handle, and means for connecting the blade with the handle.

The blade is composed of a single strip of suitable material, such as steel, which in cross-section is flat on the inner side, as shown at 5, and convex on the outer side, being thus segmental in cross-section, as will be seen at 6 in Fig. 4 of the drawings. This strip, which may be of any suitable dimensions, according to the use to which my improved implement is to be put, is bent at 7 7, so as to form angular corners, between which is disposed the straight cutting-blade 10, the bent sides 11 and 12 being made to converge in the direction of each other, their upper ends 8 8 being bent to lie in planes parallel to each other. The ends 8 8 are provided with alining perforations for the reception of fastening means, to be presently described.

The handle of my improved implement, which is designated 14, consists of an ordinary cylindrical stick, which is provided at its lower end with an enlargement 15, which is square or approximately square in cross-section and which is elongated, so as to correspond with the length of the ends 8 of the cutting member, which said ends constitute the brackets by means of which the cutting member is attached to the handle. The latter is provided with a shoulder or offset 16 adjacent to the ends of the members 8, forming a smooth finish to the device. The members 8 are connected with the sides of the head 15 of the handle by means of rivets 13, extending transversely through the latter, as will appear by reference to the drawings.

From the foregoing description it will be seen that the side members 11 and 12 of the cutting-blade diverge directly from the end of the head 15 of the handle and to the cutting-blade proper, 10, which may be of any desired length. The blade 10, as well as the side members 11 and 12, is provided, as will be seen, with cutting edges 17 on both sides thereof.

The mode of using my improved implement will be readily understood from the foregoing description, taken in connection with the drawings hereto annexed. The peculiar shape of the blade enables it to be used advantageously for the purpose of removing weeds from among growing plants without danger of injuring the latter. The implement is self-cleaning, inasmuch as by simply reversing the device any weeds, grass-roots, and the like that may have become entangled therewith will easily and instantaneously slip out. The device may also be properly described as "self-sharpening," inasmuch as at all times the upper edge of the blade will be subjected to the grinding action of the soil, and will thus be kept sufficiently sharp for all practical purposes. When the device is used for thinning rows of growing plants, it may be of a width sufficient to leave the desired space between the stands, and a single stroke will thus be sufficient to remove the plants which it may be desired to destroy. I desire to invite special attention to the fact that the square end of the handle which spaces the side members apart will positively prevent the lodgment of weeds and the like, there being absolutely no corners into which such objectionable matter may find lodgment. The device is extremely simple in its construction. It may be manufactured and sold at a very moderate expense, and it forms in every respect a most convenient and serviceable implement for the use of farmers, gardeners, and tillers of the soil generally.

Having thus described my invention, I claim—

A reversible, self-cleaning hoe comprising a handle having an enlarged head which is square in cross-section and a blade comprising a strip, segmental in cross-section, and convex on its outer side, said strip constituting a cutting-blade, converging side blades which terminate at and are spaced by the extreme front end of the head of the handle, attaching members disposed on opposite sides of said head, parallel to each other, and to the longitudinal axis of the handle and attaching means extending transversely through said attaching members and head.

In testimony that I claim the foregoing as my own I have hereto affixed my signature in the presence of two witnesses.

EDWARD B. MORGAN.

Witnesses:
A. L. BURKHOLTZ,
GLENN SHALER.